United States Patent
Licht Bøtcher et al.

(10) Patent No.: US 10,427,063 B2
(45) Date of Patent: Oct. 1, 2019

(54) METHOD FOR THE MANUFACTURE OF A PLASTICS PRODUCT AND A PRODUCT MADE BY THE METHOD

(71) Applicant: LEGO A/S, Billund (DK)

(72) Inventors: Rene Licht Bøtcher, Copenhagen (DK); Christina Hansen, Løsning (DK)

(73) Assignee: LEGO A/S (DK)

( * ) Notice: Subject to any disclaimer, the term of this patent is extended or adjusted under 35 U.S.C. 154(b) by 0 days.

(21) Appl. No.: 14/411,218

(22) PCT Filed: Jul. 1, 2013

(86) PCT No.: PCT/DK2013/050216
§ 371 (c)(1),
(2) Date: Dec. 24, 2014

(87) PCT Pub. No.: WO2014/005591
PCT Pub. Date: Jan. 9, 2014

(65) Prior Publication Data
US 2015/0190724 A1    Jul. 9, 2015

(30) Foreign Application Priority Data
Jul. 4, 2012   (DK) ................................ 2012 70393

(51) Int. Cl.
*A63H 33/04*   (2006.01)
*B29C 70/68*   (2006.01)
(Continued)

(52) U.S. Cl.
CPC ............. *A63H 33/04* (2013.01); *B29C 64/00* (2017.08); *B29C 70/68* (2013.01); *B29C 70/78* (2013.01);
(Continued)

(58) Field of Classification Search
CPC ........ A63H 9/00; A63H 33/001; A63H 33/04; A63H 33/044; A63H 33/06; A63H 33/062;
(Continued)

(56) References Cited

U.S. PATENT DOCUMENTS 2,127,043 A * 8/1938 Most ....................... B29C 70/58
264/274
3,005,282 A * 10/1961 Christiansen ........ A63H 33/086
446/128
(Continued)

FOREIGN PATENT DOCUMENTS

DE    10 2008 012064 A1    9/2009
EP       0 581 445 A1        2/1994
(Continued)

OTHER PUBLICATIONS

International Search Report for corresponding international application No. PCT/DK2013/050216, dated Oct. 28, 2013.
(Continued)

*Primary Examiner* — Eugene L Kim
*Assistant Examiner* — Alyssa M Hylinski
(74) *Attorney, Agent, or Firm* — Day Pitney LLP

(57) ABSTRACT

A method for the manufacture of a plastics product (1) and a plastics product (1), which plastics product (1) comprises a first (2) and a second (3) component that are both manufactured completely or partially from molding plastics, and which first component (2) is manufactured by molding in a mold, such as by injection molding, and which second component (3) is made by a process in which it is built in a layer-by-layer fashion, such as by 3D-printing, and having a mounting surface (7); and wherein the first component (2) is ready-molded and ejected from the mold prior to it being joined with the second component (3) to form the plastics
(Continued)

Figure 3:
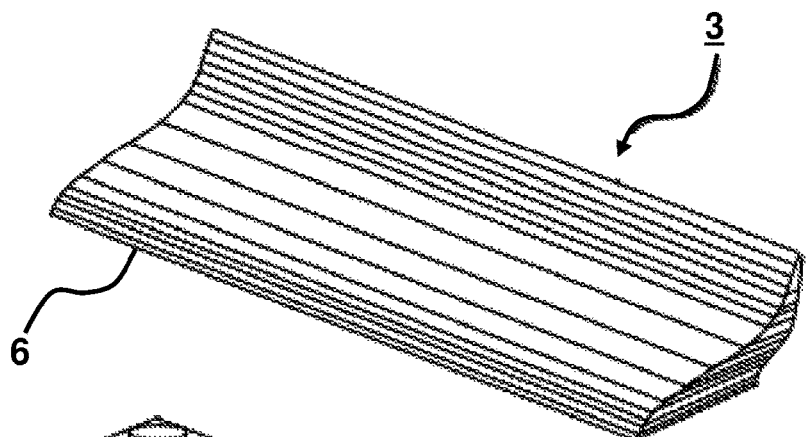

product (1). By the first layer of material formed in the 3D-printing process of manufacturing the second component (3) being formed on a surface having the same shape as the mounting surface (7) of the first component (2), it is enabled to manufacture a product with a high degree of design individuality, while simultaneously parts of the product can be made with very fine tolerances.

7 Claims, 2 Drawing Sheets

(51) Int. Cl.
  *B29C 70/78* (2006.01)
  *B32B 3/30* (2006.01)
  *B32B 38/18* (2006.01)
  *B29C 64/00* (2017.01)
(52) U.S. Cl.
  CPC .............. *B32B 3/30* (2013.01); *B32B 38/18* (2013.01); *B32B 2250/02* (2013.01)
(58) Field of Classification Search
  CPC ...... A63H 33/065; A63H 33/08; A63H 33/14; B32B 3/30; B32B 38/18; B29C 70/68; B29C 70/78
  See application file for complete search history.

(56) References Cited

U.S. PATENT DOCUMENTS

| | | | | |
|---|---|---|---|---|
| 3,034,254 | A * | 5/1962 | Christiansen | A63H 33/086 446/128 |
| 5,939,008 | A | 8/1999 | Comb et al. | |
| 6,645,033 | B1 * | 11/2003 | Thomsen | A63H 33/086 446/120 |
| 7,110,562 | B1 | 9/2006 | Feeley et al. | |
| 7,589,868 | B2 * | 9/2009 | Velde | B41C 1/00 358/3.3 |
| 8,521,319 | B2 | 8/2013 | Schmidt | |
| 9,280,616 | B2 * | 3/2016 | Cudak | G06F 17/50 |
| 2009/0203290 | A1 * | 8/2009 | Perry | A63H 33/046 446/139 |
| 2010/0311299 | A1 * | 12/2010 | Rath | A63H 33/14 446/87 |
| 2011/0021107 | A1 * | 1/2011 | Nag | A63H 33/042 446/91 |
| 2011/0077760 | A1 | 3/2011 | Schmidt et al. | |
| 2011/0266265 | A1 * | 11/2011 | Lang | A61F 2/30756 219/121.72 |

FOREIGN PATENT DOCUMENTS

| | | |
|---|---|---|
| EP | 2 301 741 A1 | 3/2011 |
| JP | 2011-528922 A | 12/2011 |
| WO | 2010/009731 A2 | 1/2010 |
| WO | 2010 071445 A1 | 6/2010 |
| WO | 2010/144284 A1 | 12/2010 |
| WO | 2013 004245 A1 | 1/2013 |
| WO | 2013 004720 A1 | 1/2013 |

OTHER PUBLICATIONS

International Preliminary Report on Patentability for corresponding international application No. PCT/DK2013/050216, dated Oct. 14, 2014.
Greenberg, A., "How a Geek Dad and His 3D Printer Aim to Liberate Legos", Forbes Magaine, Apr. 23, 2012.
SIPO's First Office Action, issued in corresponding application No. CN 2013-80035669.8, dated Dec. 2, 2015.
SIPO's Supplementary Search Report, issued in corresponding application No. CN 2013-80035669.8, dated Jun. 29, 2016.
SIPO's Second Office Action, issued in corresponding application No. CN 2013-80035669.8, dated Jul. 15, 2016.
JPO's Notification of Reasons for Refusal, issued in corresponding application No. JP 2015-518850, dated May 16, 2017.

* cited by examiner

METHOD FOR THE MANUFACTURE OF A PLASTICS PRODUCT AND A PRODUCT MADE BY THE METHOD

CROSS-REFERENCE TO RELATED APPLICATIONS

This application is a U.S. National Stage of International Application No. PCT/DK2013/050216, filed on 1 Jul. 2013 and published on 9 Jan. 2014, as WO 2014/005591 A1, which claims the benefit of priority to Danish Patent Application No. PA 2012 70393, filed on 4 Jul. 2012.

FIELD OF APPLICATION OF THE INVENTION

The present invention relates to a method for the manufacture of a plastics product, such as a building element for a toy building set, and a plastics product manufactured by the method, which plastics product comprises a first and a second component that are both manufactured completely or partially from moulding plastics, and which first component is manufactured by moulding in a mould, such as by injection moulding, and which second component is made by a process in which it is built in a layer-by-layer fashion, such as by 3D-printing, and having a mounting surface; and wherein the first component and the second component are joined permanently to form the plastics product, the first component being ready-moulded and ejected from the mould prior to it being joined with the second component.

By 'permanent joining' is to be understood any joining made in such a manner that it is not intended that the first and second components can be separated from each other after being joined permanently. Examples of permanent joining of plastics products include gluing, welding, or soldering.

STATE OF THE ART

Today, several embodiments of production of plastics products are known by which the products are built in a layer-by-layer fashion, eg by repeated solidification of a thin liquid layer on a substrate and a previously solidified liquid layer, by repeated printing with a thermo-plastic plastics material on a substrate, or on a previously printed layer of plastics material, or by repeated soldering in a layer-by-layer fashion of plastics material eg by use of laser. A common designation for those processes is "rapid prototyping", as those processes are extremely suitable for the production of single or relatively small numbers of identical products.

Moreover, the development of in particular apparatuses with associated software for 3D-printing has made it possible for households and others to print various products entirely in accordance with one's own design.

WO 2010071445 teaches a method for the manufacture of a plastics product by which a layered component is first manufactured eg by 3D-printing; and wherein that first component is subsequently arranged in a moulding tool having a mould cavity capable of receiving the layered first component, and moreover space for plastics to be introduced which will thereby bond to the surface of the 3D-printed component.

Hereby it is enabled to eg 3D-print a part of the product following which that component may partake as a core constituent in the finished product in that it is possible to subsequently mould, in the moulding tool, eg by injection moulding, a surface on the 3D-printed product which has a surface which is far smoother than the surface of the 3D-printed product.

U.S. Pat. No. 7,110,562 B1 teaches an auditory device and a method of manufacturing the auditory device, wherein the outermost component of the part of the auditory device that is fitted into the ear is, based on a scanning, customer-fitted individually and manufactured by means of a kind rapid prototyping, eg SLA; and wherein a wire and a speaker are injection moulded together in another component. The injection-moulded component, including speaker and wire, is inserted into the outermost component and is interconnected therewith by means of a link module.

Hereby, it is made possible to adapt the shape of that part of the auditory device which fitted into the ear to the individual user to the effect that it becomes as invisible as possible, and it makes it easy to replace defective parts, if any. Moreover, it is not as costly and time-consuming to manufacture a new outer part of the auditory device in case the fit is not optimal.

U.S. Pat. No. 5,939,008 teaches a rapid prototyping apparatus and its method of making three-dimensional objects, wherein the three-dimensional object is made by sequentially depositing multiple layers material on a flexible sheet substrate which is, upon completion, peeled away from the object. The sheet substrate may be a polymer, eg acrylic.

Hereby a substrate is accomplished for printing of three-dimensional objects that does not distort or in any other way damage the object, is in that, following printing of the object, the substrate is easily peeled away from the object.

OBJECT OF THE INVENTION

Based on this, it is the object of the present invention to provide a method as set forth above, whereby it is possible to produce a product wherein a part of the product is made with very fine tolerances, but wherein the other part can be produced with a high degree of freedom to design the product in accordance with individual desires.

This is accomplished in accordance with the invention in that the first layer of material formed in the 3D-printing process of manufacturing the second component is formed on a surface having the same shape as the mounting surface of the first component.

According to a preferred embodiment, the mounting surface of the first component will abut on a correspondingly configured mounting surface of the second component when the second component has been manufactured and joined with the first component.

The second component may optionally be manufactured as a separate element relative to the first component which is subsequently joined with the first component by gluing, welding, soldering, or other joining method.

Alternatively, the first component may be manufactured first, following which the second component is manufactured by 3D-printing directly on the mounting surface of the ready-welded first component.

By a preferred embodiment of the invention, one or more further moulded components is/are made in addition to the first component; and wherein the second component is subsequently joined with more from among the first and the further components.

In this context, the moulded components are, during joining with the second component, advantageously arranged in a fixture which is configured such that the first and the further components are retained in a specific position relative to each other. Moreover, the fixture may be configured such that it ensures that the surface of the block is positioned accurately relative to the print on top, and such that one hereby controls the orientation of the block relative to the setting of the printer for the starting point in the x- and y-directions.

The invention further relates to a plastics product comprising a first component and a second component that both have a mounting surface; and wherein the two components are secured to each other in such a way that the mounting surfaces on the first and second components are joined and abut on each other; and wherein the first component is moulded, and the second component is built in a layer-by-layer fashion from a plastics material, such as by 3D-printing; and which product is manufactured by the method said forth above.

In this context, the mounting surface of the first component may be configured on a plate-shaped part of the first component, and from the plate-shaped part, on the opposite side of the mounting surface, one or more flanges may extend at an angle to the plate-shaped part.

It is particularly easy to join the two components if the plate-shaped part, where the mounting surface extends, is essentially plane.

Moreover, one or more of the flanges may advantageously be configured as an uninterrupted round-going flange.

Particularly advantageously, the plate-shaped part has an outer periphery, and one of the round-going flanges extends from the outer periphery on the plate-shaped part.

According to a further advantageous embodiment, one or more of the flanges extend(s) essentially at right angles to the plate-shaped part.

The present invention is particularly suitable in the context of toy building sets comprising a plastics product as set forth above, wherein the first component constitutes a building element of the toy building set comprising a number of building elements; and wherein the building elements comprise building elements having a body part with a surface on which a number of coupling studs are provided, and building elements that are, on the opposite side, configured with a number of flanges that extend from the side of the body part which is opposite to the surface; and wherein those flanges are configured such that they form coupling flanges that can be interconnected with the coupling studs on another building element; and wherein the surface of the body part on the first component comprises the mounting surface for permanent joining with the second component.

LIST OF FIGURES

Figure 2:
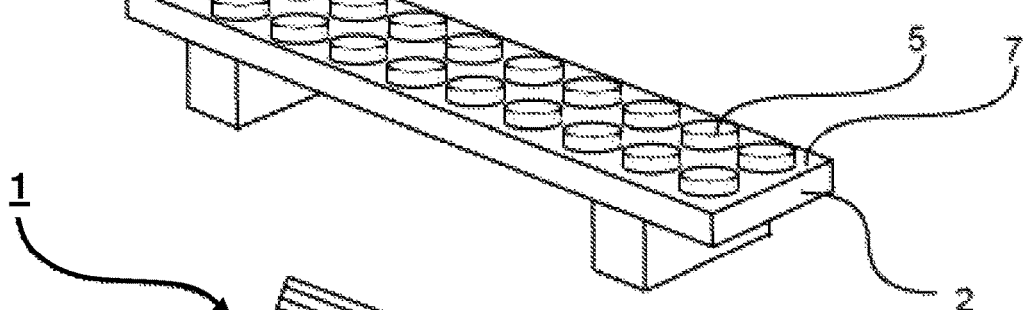
Figure 1:
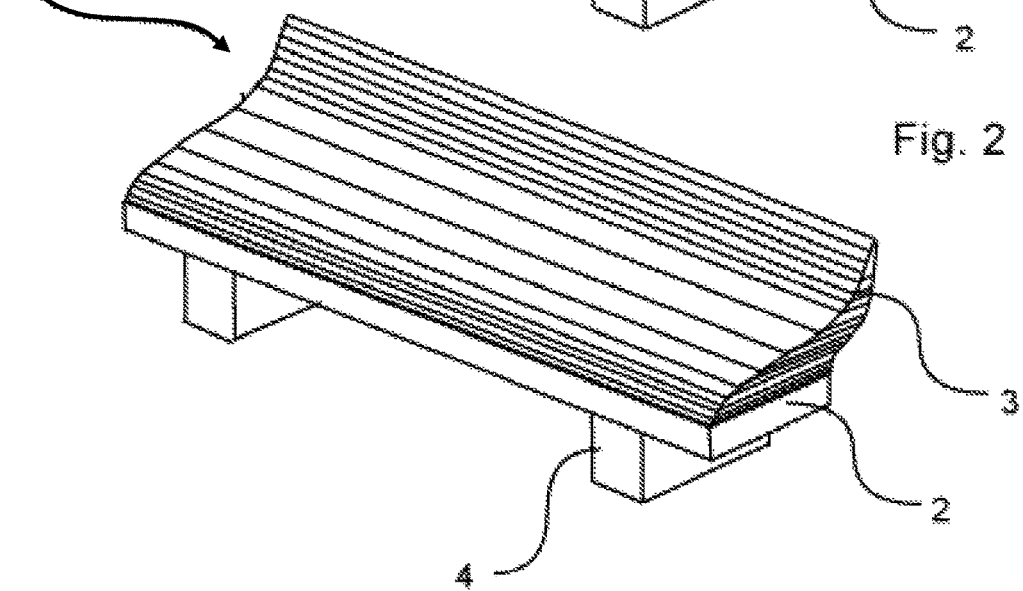
Figures 5, 6:
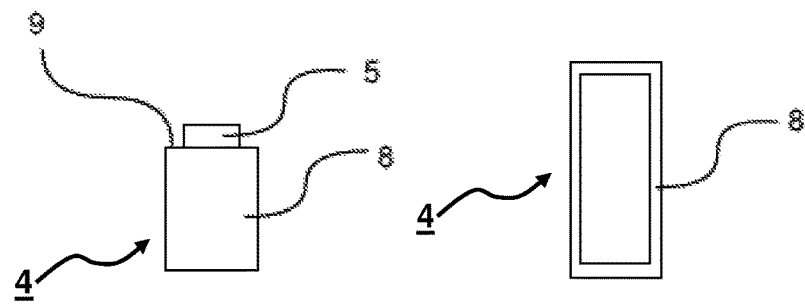
Figure 4:
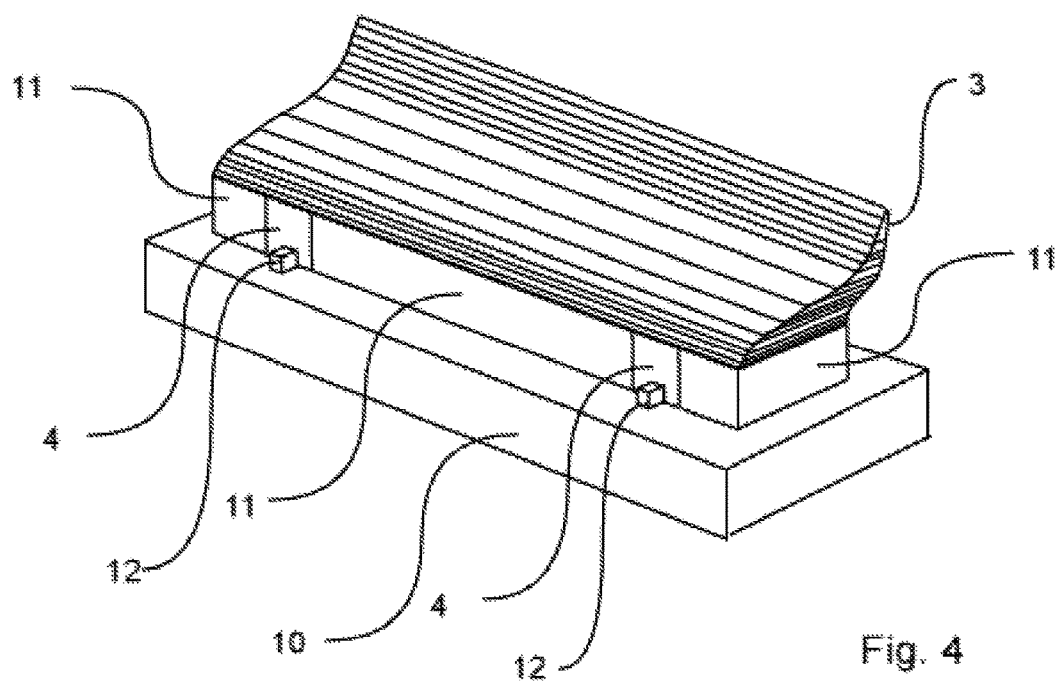

FIG. 1: shows, in a perspective view, a joined plastics product according to the invention;

FIG. 2: shows, in a perspective view, a first part of the plastics product shown in FIG. 1;

FIG. 3: shows, in a perspective view, a second part of the plastics product shown in FIG. 1;

FIG. 4: shows, in a perspective view, an alternative embodiment of a joined plastics product according to the invention, shown arranged in a fixture;

FIG. 5: shows, in a perspective view, a building element of the plastics product shown in FIG. 4, seen from one side;

FIG. 6: shows, in a perspective view, a building element of the component shown in FIG. 5, seen from below.

EMBODIMENT OF THE INVENTION

Thus, FIG. 1 shows a plastics product in the form of a rear spoiler 1 which may, for instance, be mounted on a model vehicle (not shown) built of building elements from a toy building set, and the rear spoiler 1 comprises a first component in the form of a building plate 2 on which a second component 3 is provided which is manufactured by a method in which it is built in a layer-by-layer fashion, such as by 3D-printing.

FIGS. 2 and 3 show the same components as were shown in FIG. 1, but in a non-assembled state, and it will appear from FIG. 2 that the building plate 2 has a plane surface 7 on which a number of coupling studs 5 are configured that are, in a known manner, configured such that they can be interconnected with other elements of the (not shown) toy building set. For instance, the building element 4 shown in FIGS. 5 and 6 may be interconnected with the building plate 2 by the underside of the building element 4 being pressed down onto the coupling studs 5 on the building plate 2 to the effect that the sides of the coupling studs 5 abut on the inner side of the round-going flange 8 configured along the building element 4.

However, in accordance with the invention, it is an option to mount the second component 3 instead, whereby the assembled rear spoiler 1, as shown in FIG. 1, resembles an actual rear spoiler to a far higher degree than that which can be obtained exclusively by means of box-shaped building elements using the building plate 2 and the two building elements 4, as shown in FIG. 2. Hereby it is enabled that individually designed pieces can be printed, ie 'customization', and that a more realistic and organic appearance can be obtained in toy building sets by use of the invention.

According to the invention, the building plate 2 is manufactured first by means of a commonly known modelling process, such as by injection moulding, wherein a suitable amount of fluid plastics material is injected into a substantially closed mould cavity in a moulding tool. Such moulding processes being commonly known to the person skilled in the art, they are not shown herein.

Moreover, the second component 3, which is shown in FIG. 3, is manufactured in a commonly known process, whereby that component is built in a layer-by-layer fashion from plastics. Today, several embodiments of such production processes for the manufacture of plastics products are known, whereby the products are built layer by layer, eg by repeated solidification of a thin liquid layer on a substrate and on a previously solidified liquid layer, or by repeated printing with a thermoplastic plastics material on a substrate or on a previously printed layer of plastics material. A common designation for those processes is "rapid prototyping", and such processes are extremely suitable for the production of single or relatively small numbers of identical products.

Underneath the building plate 2, two building elements 4 are mounted which are of the type shown in FIGS. 5 and 6, and which may constitute a part of the toy building set or a part of the building plate 2.

FIG. 4 shows an alternative embodiment of the invention, two building elements 4 being used, as shown in FIGS. 5 and 6, as the first component; and wherein the two building elements 4 are arranged in a fixture 10 that retains them in a position relative to each other by means of a number of guide pins 12 and a number of platforms 11 that are configured on the fixture 10.

The plastics product 1 shown in FIG. 4 is thus constituted of two building elements 4 that constitute a first component 4, and a further component 4, both of which are made in a mould, and the second component 3 corresponding to the disclosures of FIG. 3, but is 3D-printed layer by layer on top the surface 9 of the first component 4 and the further component 4. It being difficult to 3D-print without substrate, the fixture 10 is configured such that the three platforms 11 each has a surface which is flush with the surface 9 of the two building elements 4.

What is claimed is:

1. A method for the manufacture of a plastics product:
   wherein the plastics product comprises a first and a second component that are both manufactured completely or partially from moulding plastics, and in which the first component is manufactured by injection moulding in a mould and includes a first mounting surface, and in which the second component is made by a 3D-printing process in which it is built in a layer-by-layer fashion and includes a second mounting surface; and
   wherein the first component is ready-moulded and ejected from the mould and then subsequently configured to be permanently joined to the second component to form the plastics product wherein the first component is manufactured first, following which the second component is manufactured by 3D-printing a first layer of material formed in the 3D-printing process of manufacturing the second component directly on the first mounting surface of the ready-moulded first component such that the second mounting surface is shaped to conform to the first mounting surface of the first component;
   such that the first component and the second component are secured to each other in such a way that the first mounting surface and the second mounting surface directly abut one another, and wherein the first mounting surface of the first component is configured on a plate-shaped part of the first component; and
   wherein one or more flanges extend at an angle from the plate-shaped part on a side of the first mounting surface opposite the plate-shaped part, said flanges extending beyond an outer periphery of the plate-shaped part of the first component.

2. The method according to claim 1, characterised in that one or more further moulded components is/are made in addition to the first component; and wherein the second component is subsequently joined with one or more from among the further components.

3. The method according to claim 2, characterised in that the further moulded components are, during joining with the second component, arranged in a fixture which is configured such that the first and the further components are retained in a specific position relative to each other.

4. The method according to claim 1, characterised in that the plate-shaped part, where the mounting surface extends, is essentially plane.

5. The method according to claim 4, characterised in that each of the one or more of the flanges is configured as an uninterrupted round-going flange.

6. The method according to claim 1, characterised in that one or more of the flanges extend essentially at right angles to the plate-shaped part.

7. The method according to claim 6, characterized in that the first component constitutes a building element for use in a toy building set comprising a plurality of building elements; and wherein the first component includes a number of coupling studs extending from the first mounting surface that correspond to coupling studs of the other building elements of the toy building set, and wherein the one or more flanges of the first component are configured as coupling flanges for interconnecting with the coupling studs of the other building elements.

* * * * *